(12) United States Patent
Yamada et al.

(10) Patent No.: US 8,758,133 B2
(45) Date of Patent: Jun. 24, 2014

(54) GAME SYSTEM WITH SELECTIVE ORIENTATION CONTROL

(75) Inventors: Yoichi Yamada, Kyoto (JP); Ryo Tanaka, Kyoto (JP); Hidemaro Fujibayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 209 days.

(21) Appl. No.: 12/955,248

(22) Filed: Nov. 29, 2010

(65) Prior Publication Data

US 2011/0306418 A1    Dec. 15, 2011

(30) Foreign Application Priority Data

Jun. 11, 2010    (JP) .................................. 2010-134562

(51) Int. Cl.
*G06F 17/00* (2006.01)
(52) U.S. Cl.
USPC .................... 463/37; 463/36; 463/38; 463/39
(58) Field of Classification Search
USPC ...................................................... 463/36–38
See application file for complete search history.

(56) References Cited

U.S. PATENT DOCUMENTS

| | | | | |
|---|---|---|---|---|
| 6,215,473 | B1 * | 4/2001 | Suzuki | 345/163 |
| 6,860,813 | B2 * | 3/2005 | Kubo | 463/30 |
| 7,084,855 | B2 * | 8/2006 | Kaku et al. | 345/158 |
| 2006/0287085 | A1 * | 12/2006 | Mao et al. | 463/37 |
| 2008/0076566 | A1 * | 3/2008 | Miyamoto | 463/37 |
| 2008/0076567 | A1 * | 3/2008 | Dohta | 463/37 |
| 2008/0254898 | A1 * | 10/2008 | Endo | 463/43 |
| 2009/0111580 | A1 * | 4/2009 | Nakajima | 463/37 |

FOREIGN PATENT DOCUMENTS

| | | |
|---|---|---|
| JP | 2000-308756 | 11/2000 |
| JP | 2010-017389 | 1/2010 |

* cited by examiner

*Primary Examiner* — Ronald Laneau
*Assistant Examiner* — Justin Myhr
(74) *Attorney, Agent, or Firm* — Nixon & Vanderhye, P.C.

(57) ABSTRACT

Respective orientations (a pitch angle, a roll angle, and a yaw angle) of the input device are detected based on angular velocity data outputted from a gyro sensor unit of an input device. Then, it is determined whether the pitch angle is within a first range or within a second range. When it has been determined that the pitch angle is within the first range, a posture of an object is updated based on the roll angle. When it has been determined that the pitch angle is within the second range, the posture of the object is updated based on the yaw angle. Accordingly, operability can be improved in a game executed in accordance with an orientation of the input device.

12 Claims, 16 Drawing Sheets

F I G. 4
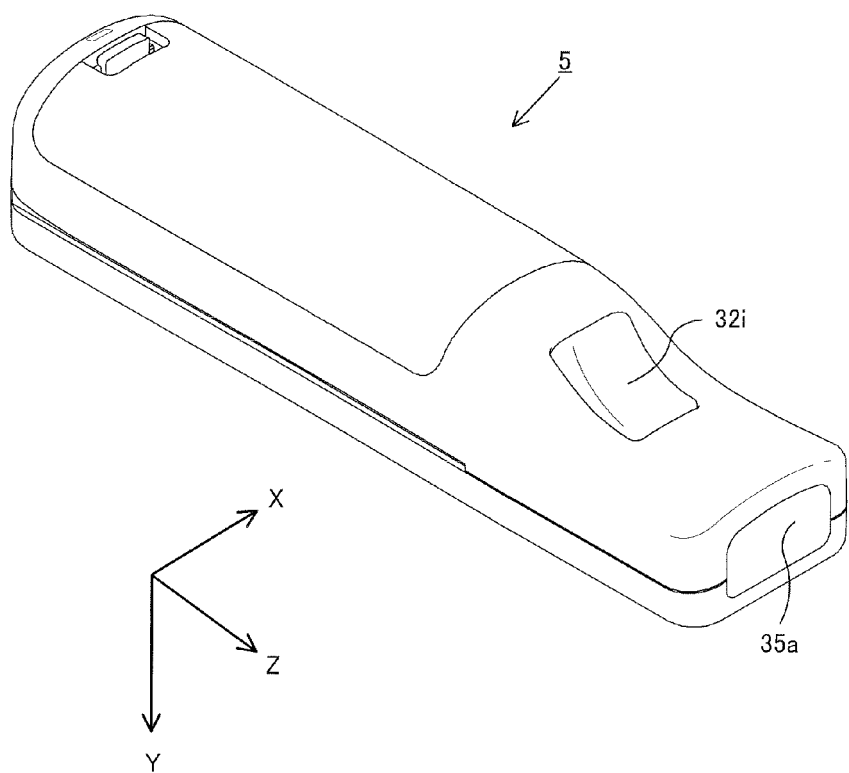

000000# GAME SYSTEM WITH SELECTIVE ORIENTATION CONTROL

CROSS REFERENCE TO RELATED APPLICATION

The disclosure of Japanese Patent Application No. 2010-134562, filed Jun. 11, 2010, is incorporated herein by reference.

BACKGROUND OF THE INVENTION

1. Field of the Invention

The present invention relates to a computer-readable storage medium, a game apparatus, a game system, and a game method for performing game processing based on an orientation of an input device.

2. Description of the Background Art

Conventionally, game apparatuses which control an object in a virtual game world in accordance with an orientation of a controller operated by a player, have been known.

For example, Patent Literature 1 (Japanese Patent Laid-Open Publication No. 2000-308756 (paragraphs [0019] to [0021])) discloses a game apparatus with which a player performs a game by using a controller having a multiaxial acceleration sensor and a multiaxial gyro sensor. Specifically, a control is performed so that a sword which is an object in a game is swung based on an output of the multiaxial acceleration sensor, and a control is performed so that the sword is twisted or tilted based on an output of the multiaxial gyro sensor.

Patent Literature 2 (Japanese Patent Laid-open Publication No. 2010-17389 (abstract, paragraph [0195])) discloses a game apparatus which reflects an orientation of a controller detected by a gyro sensor to a posture of an object in a game space.

However, the game apparatuses disclosed in Patent Literature 1 and Patent Literature 2 are unable to allow a free controller operation because a posture of an object corresponding to an orientation of the controller is uniquely determined. For example, in order to cause an object to perform a predetermined operation, one player prefers an operation to twist a controller while another player prefers to swing a controller in a left/right direction. In such a case, the game apparatuses disclosed in Patent Literature 1 and Patent Literature 2 have to permit either one of the operations.

SUMMARY OF THE INVENTION

Therefore, a main object of the present invention is to improve operability in a game executed based on an orientation of the input device.

To attain the above object, the present invention has the following features.

A computer-readable storage medium according to the present invention is a storage medium having stored therein a game program which causes a computer of a game apparatus, which performs game processing based on an orientation of an input device, to function as orientation detection means, orientation determination means, and game processing means. The orientation detection means detects an orientation of the input device. The orientation determination means determines whether the orientation of the input device satisfies a first condition or satisfies a second condition. The game processing means updates, while the orientation of the input device satisfies the first condition, a specific game parameter in accordance with a change in an orientation of the input device around a first axis. The game processing means updates, while the orientation of the input device satisfies the second condition, the specific game parameter in accordance with a change in an orientation of the input device around a second axis.

Accordingly, in accordance with the orientation of the input device, an input operation mode is automatically switched between a first input operation mode which updates the specific game parameter in accordance with the change in the orientation of the input device around the first axis and a second input operation mode which updates the specific game parameter in accordance with the change in the orientation of the input device around the second axis. Consequently, regardless of the orientation of the input device, good operability can be constantly obtained. Further, the player can perform an input operation in an input operation mode that suits his/her preference, which allows a greater degree of freedom to the operation.

The orientation determination means may determine whether an orientation of the input device around a third axis satisfies the first condition or satisfies the second condition.

Accordingly, in accordance with the orientation of the input device around the third axis, the input operation mode can be automatically switched between the first input operation mode and the second input operation mode.

The game processing means may reflect, while the orientation of the input device satisfies neither the first condition nor the second condition, neither the change in the orientation of the input device around the first axis nor the change in the orientation of the input device around the second axis to the specific game parameter.

Accordingly, when the orientation of the input device satisfies neither the first condition nor the second condition, both the first input operation mode and the second input operation mode can be disabled.

The input device may include an angular velocity sensor, and the orientation detection means may detect the orientation of the input device based on angular velocity data outputted from the angular velocity sensor.

Accordingly, a change in an orientation of the input device around a predetermined axis can be easily detected.

The angular velocity sensor is capable of detecting respective angular velocities of the input device around the first axis, the second axis, and the third axis. The orientation detection means may detect the orientation of the input device around the first axis, the orientation of the input device around the second axis, and the orientation of the input device around the third axis, based on the respective angular velocities of the input device around the first axis, the second axis, and the third axis, which have been detected by the angular velocity sensor.

The game processing means may include: first determination means which determines whether an amount of change in the orientation of the input device around the first axis from a predetermined reference orientation exceeds a predetermined threshold value; and second determination means which determines whether an amount of change in the orientation of the input device around the second axis from a predetermined reference orientation exceeds a predetermined threshold value. The game processing means may update, while the orientation of the input device satisfies the first condition, only when the determination result of the first determination means is positive, the specific game parameter in accordance with the change in the orientation of the input device around the first axis. The game processing means may update, while the orientation of the input device satisfies the second condition, only when the determination result of the second determination means is positive, the specific game parameter in accordance with the change in the orientation of the input device around the second axis.

Accordingly, only when the amount of change in the orientation from the reference orientation exceeds the predetermined threshold value, the specific game parameter is updated in accordance with the orientation of the input device, resulting in prevention of an error control due to hand jiggling or the like.

The game program may further cause the computer to function as game image generating means which generates a game image based on the specific game parameter.

The specific game parameter is a game parameter which affects at least one of a position, a posture, and an action of a specific object (90) in a game world. The game image generating means may generate a game image which contains the specific object.

The game image generating means may generate a game image which contains an image (91) indicating the determination result of the orientation determination means.

Accordingly, whether the current input operation mode is the first input operation mode or the second input operation mode can be presented to the player.

A game apparatus according to the present invention is a game apparatus which performs game processing based on an orientation of an input device, and includes orientation detection means, orientation determination means, and game processing means. The orientation detection means detects an orientation of the input device. The orientation determination means determines whether the orientation of the input device satisfies a first condition or satisfies a second condition. The game processing means updates, while the orientation of the input device satisfies the first condition, a specific game parameter in accordance with a change in an orientation of the input device around a first axis. The game processing means updates, while the orientation of the input device satisfies the second condition, the specific game parameter in accordance with a change in an orientation of the input device around a second axis.

A game system according to the present invention is a game system which performs game processing based on an orientation of an input device, and includes orientation detection means, orientation determination means, and game processing means. The orientation detection means detects an orientation of the input device. The orientation determination means determines whether the orientation of the input device satisfies a first condition or satisfies a second condition. The game processing means updates, while the orientation of the input device satisfies the first condition, a specific game parameter in accordance with a change in an orientation of the input device around a first axis. The game processing means updates, while the orientation of the input device satisfies the second condition, the specific game parameter in accordance with a change in an orientation of the input device around a second axis.

A game method according to the present invention is a game method for performing game processing based on an orientation of an input device, and includes an orientation detection step, an orientation determination step, and a game processing step. The orientation detection step detects an orientation of the input device. The orientation determination step determines whether the orientation of the input device satisfies a first condition or satisfies a second condition. The game processing step updates, while the orientation of the input device satisfies the first condition, a specific game parameter in accordance with a change in an orientation of the input device around a first axis. The game processing step updates, while the orientation of the input device satisfies the second condition, the specific game parameter in accordance with a change in an orientation of the input device around a second axis.

According to the present invention, operability in a game executed based on an orientation of the input device can be improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view illustrating an external structure of a controller.

DESCRIPTION OF THE PREFERRED EMBODIMENTS

[Overall Configuration of Game System]

Figure 1:
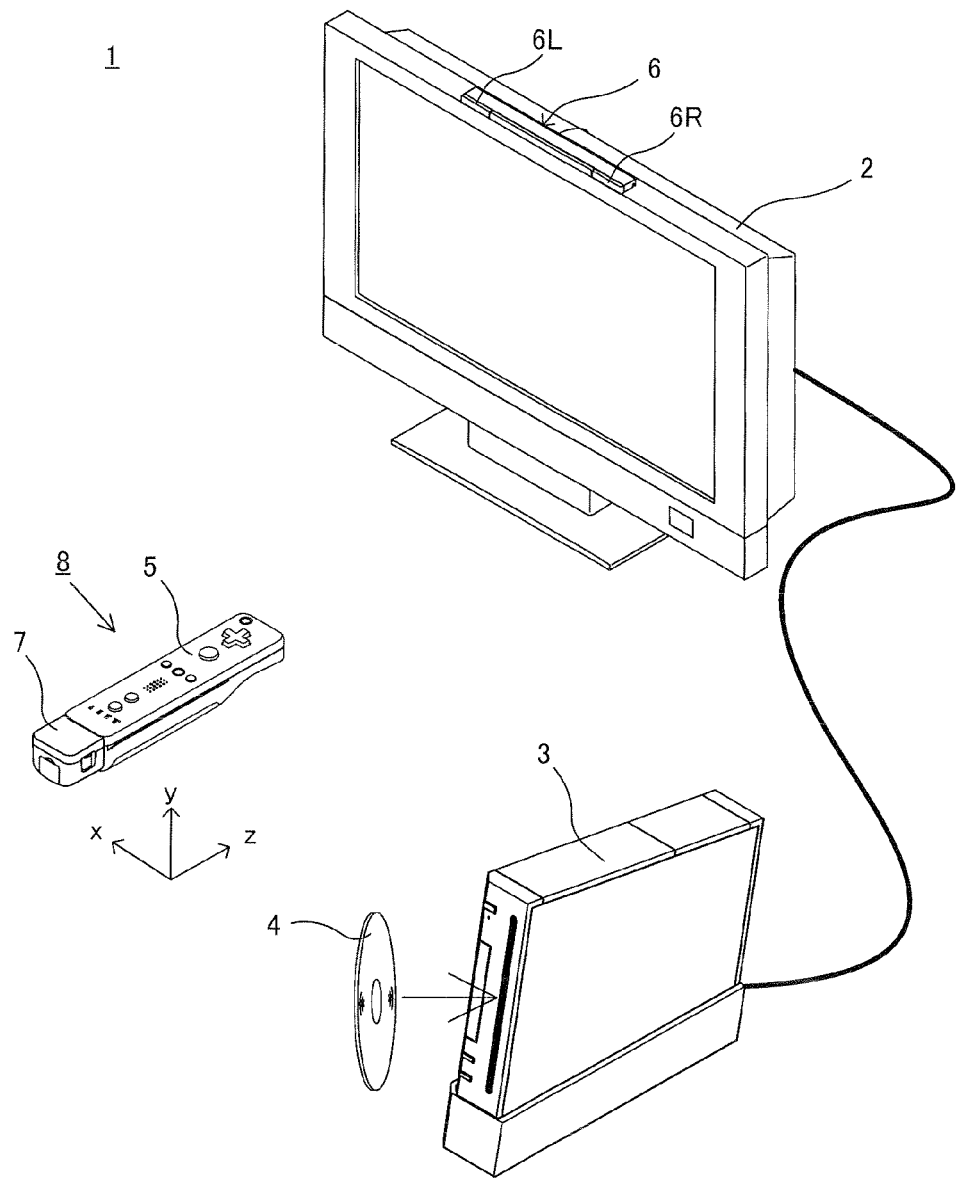
FIG. 1 is an external view of a game system.

With reference to FIG. 1, a game system 1 including a game apparatus according to an embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs game process based on a game operation using the input device 8.

In the game apparatus 3, the optical disc 4 typifying an information storage medium used for the game apparatus 3 in an exchangeable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, via a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LED, and emits an infrared light forward from the television 2. The marker section 6 is connected to the game apparatus 3, and the game apparatus 3 is able to control each infrared LED of the marker section 6 so as to light each infrared LED up.

The input device 8 provides the game apparatus 3 with operation data representing a content of an operation performed on the input device 8 itself. In the present embodiment, the input device 8 includes a controller 5 and a gyro sensor unit 7. As described in detail below, the input device 8 is structured such that the gyro sensor unit 7 is detachably connected to the controller 5. Radio communication is made between the controller 5 and the game apparatus 3. In the present embodiment, the radio communication between the controller 5 and the game apparatus 3 is made by using, for example, the Bluetooth (Registered Trademark) technology. In another embodiment, connection between the controller 5 and the game apparatus 3 may be a wired connection.

[Internal Structure of Game Apparatus 3]

Figure 2:
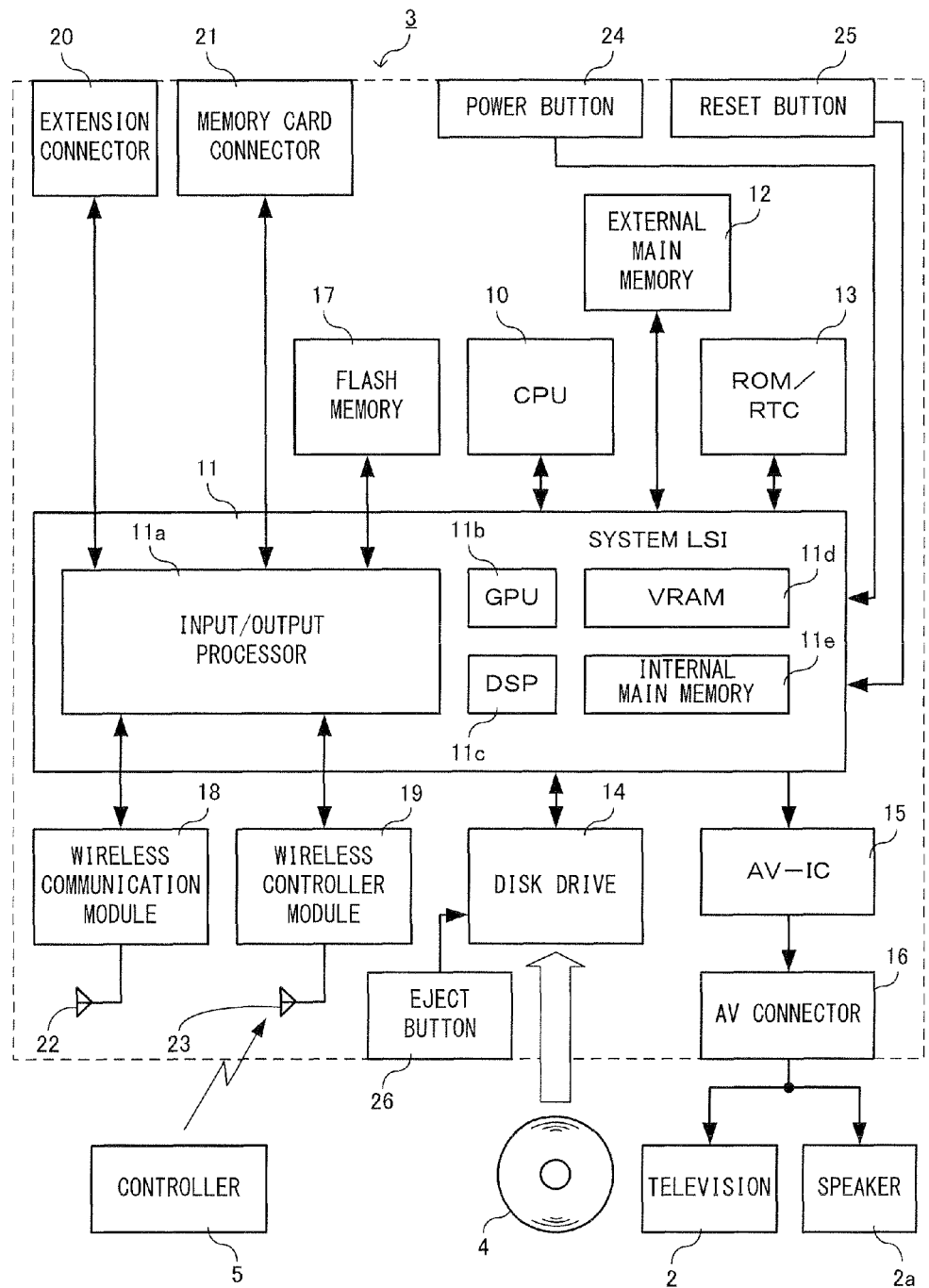
FIG. 2 is a function block diagram of a game apparatus.

Next, an internal structure of the game apparatus 3 will be described with reference to FIG. 2. FIG. 2 is a block diagram illustrating a structure of the game apparatus 3. The game apparatus 3 includes the CPU 10, a system LSI 11, an external main memory 12, a ROM/RTC 13, a disk drive 14, an AV-IC 15, and the like.

The CPU 10, functioning as a game processor, performs a game process by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI 11 will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (so-called a boot ROM) incorporating a boot program for the game apparatus 3, and a clock circuit (RTC: Real Time Clock) for counting a time. The disk drive 14 reads program data, texture data, and the like from the optical disk 4, and writes the read data into an internal main memory 11e or the external main memory 12 described below.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data by using data stored in the VRAM 11d.

The DSP 11c, functioning as an audio processor, generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the component connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects data, if any, which needs to be transmitted to the network, and transmits, when the data is detected, the data to the network through the wireless communication module 18 and the antenna 22. Further, the input/output processor 11a receives data transmitted from another game apparatus, and/or download data from a download server, through the network, the antenna 22, and the wireless communication module 18, and stores the received data and/or the downloaded data in the flash memory 17. The CPU 10 executes a game program so as to read data stored in the flash memory 17 and use the data on the game program. The flash memory 17 may store saved data (game result data or intermediate step data) of a game played by using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data in a buffer area of the internal main memory 11e or the external main memory 12.

Further, the input/output processor 11a is connected to the extension connector 20 and the memory card connector 21. The extension connector 20 is a connector for interface, such as a USB or a SCSI, and allows communication with the network by connecting thereto a media such as an external storage media, connecting thereto a peripheral device such as another controller, and/or connecting thereto a wired communication connector, without using the wireless communication module 18. The memory card connector 21 is a connector for connecting thereto an external storage media such as a memory card. For example, the input/output processor 11a accesses an external storage media through the extension connector 20 or the memory card connector 21 so as to store data in the external storage media or read data from the external storage media.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 3:
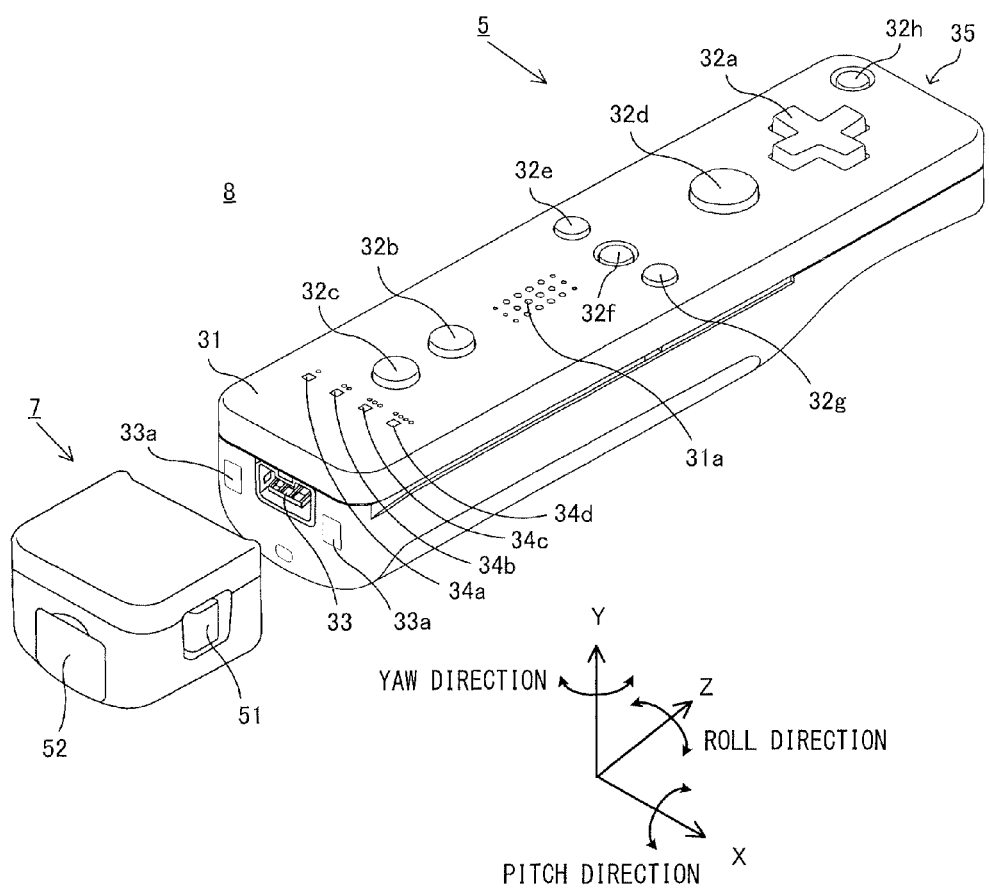
FIG. 3 is a perspective view illustrating an external structure of an input device.

Next, with reference to FIGS. 3 to 6, the input device 8 will be described. FIG. 3 is a perspective view illustrating an external structure of an input device 8. FIG. 4 is a perspective view illustrating an external structure of the controller 5. FIG. 3 is a perspective view illustrating the controller 5 as viewed from the top rear side thereof, and FIG. 4 is a perspective view illustrating the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and the entire housing 31 has such a size as to be able to be held by one hand of an adult or even a child. A player is allowed to perform game operation by pressing buttons provided on the controller 5, and moving the controller 5 so as to change the position and the orientation thereof.

The housing 31 has a plurality of operation buttons. As shown in FIG. 3, on the top surface of the housing 31, a cross button 32*a*, a first button 32*b*, a second button 32*c*, an A button 32*d*, a minus button 32*e*, a home button 32*f*, a plus button 32*g*, and a power button 32*h* are provided. On the other hand, as shown in FIG. 4, a recessed portion is formed on a bottom surface of the housing 31, and a B button 32*i* is provided on a rear slope surface of the recessed portion. The operation buttons 32*a* to 32*i* are assigned, as necessary, with respective functions in accordance with the game program executed by the game apparatus 3. Further, the power button 32*h* remote-controls the power of a body of the game apparatus 3 to be on or off. The home button 32*f* and the power button 32*h* each has the top surface thereof buried in the top surface of the housing 31. Therefore, the home button 32*f* and the power button 32*h* are prevented from being inadvertently pressed by the player.

On a rear surface of the housing 31, the connector 33 is provided. The connector 33 is used for connecting the controller 5 to another device (for example, the gyro sensor unit 7 or another controller). Both side surfaces of the connector 33 provided on the rear surface of the housing 31 each has a locking hole 33*a* for preventing easy removal of another device as described above.

In the rear portion on the top surface of the housing 31, a plurality (four in FIG. 3) of LEDs 34*a*, 34*b*, 34*c*, and 34*d* are provided. The controller 5 is assigned a controller type (number) so as to be distinguishable from another main controller. The LEDs 34*a*, 34*b*, 34*c*, and 34*d* are each used for informing a player of the controller type which is currently set to controller 5 that he/she is using, and for informing a player of remaining battery power of the controller 5, for example. Specifically, when a game operation is performed by using the controller 5, one of the plurality of LEDs 34*a*, 34*b*, 34*c*, and 34*d* corresponding to the controller type is lit up.

The controller 5 has an imaging information calculation section 35 (FIG. 7), and a light incident surface 35*a* of the imaging information calculation section 35 is provided on the front surface of the housing 31, as shown in FIG. 4. The light incident surface 35*a* is made of material passing therethrough at least infrared light outputted from the markers 6R and 6L.

On the top surface of the housing 31, a sound hole 31*a* for externally outputting a sound from a speaker 49 (shown in FIG. 5) which is incorporated in the controller 5 is provided between the first button 32*b* and the home button 32*f*.

Figure 5:
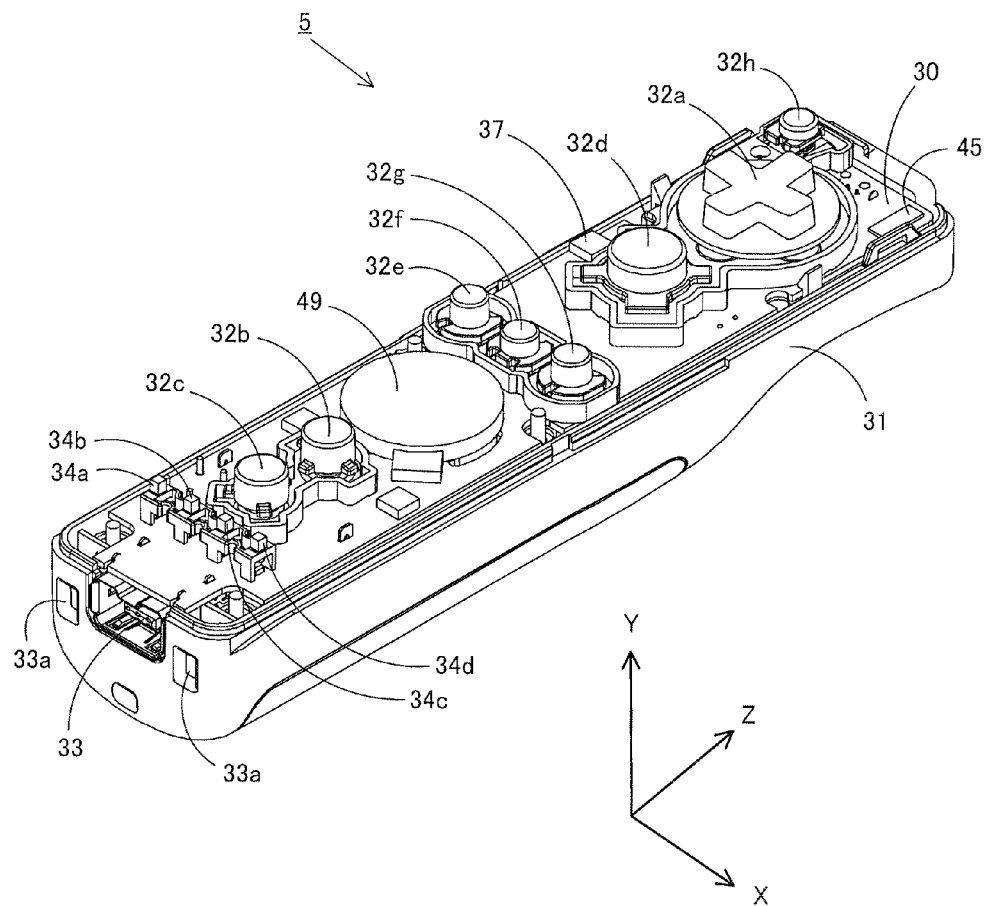
FIG. 5 shows an internal structure of the controller.
Figure 6:
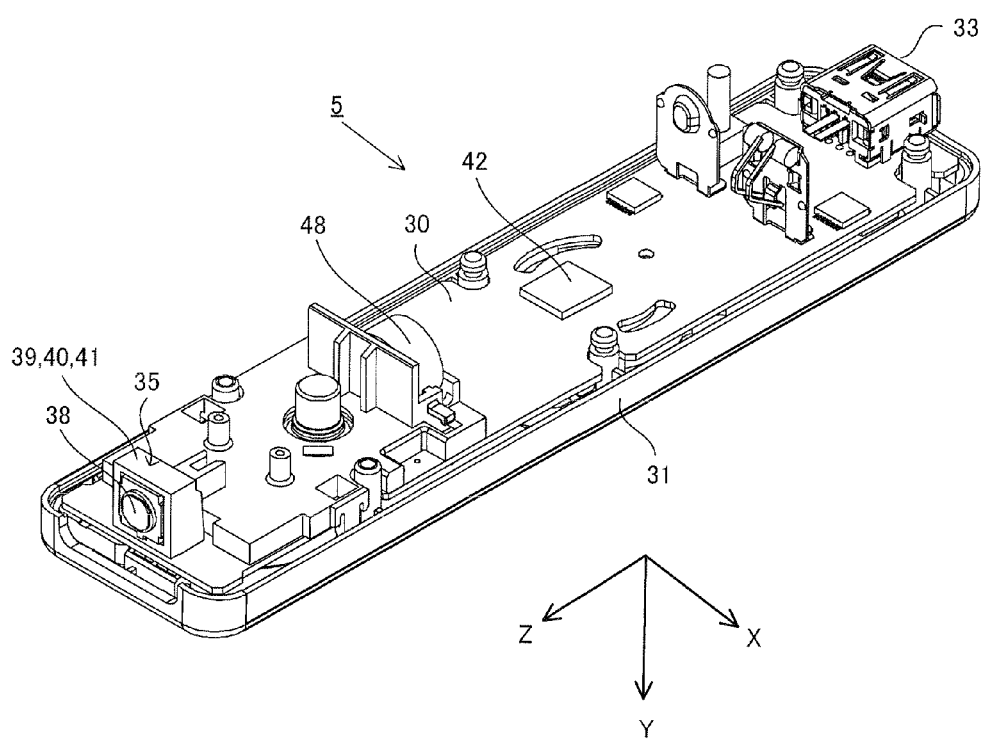
FIG. 6 shows the internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31, and on a top main surface of the substrate 30, the operation buttons 32*a* to 32*h*, the LEDs 34*a* to 34*d*, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided in front of the center of the controller 5 with respect to the longitudinal direction (Z-axis direction). Further, a wireless module 44 (see FIG. 7) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, the image pickup element 40 and an image processing circuit 41 located in order, respectively, from the front surface of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by an actuation of the vibrator 48 based on a command from the microcomputer 42. Therefore, the vibration is conveyed to the player's hand holding the controller 5, and thus a so-called vibration-responsive game is realized. In the present embodiment, the vibrator 48 is disposed slightly toward the front of the housing 31. That is, the vibrator 48 is positioned at the end portion of the controller 5 offset from the center thereof, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Figure 7:
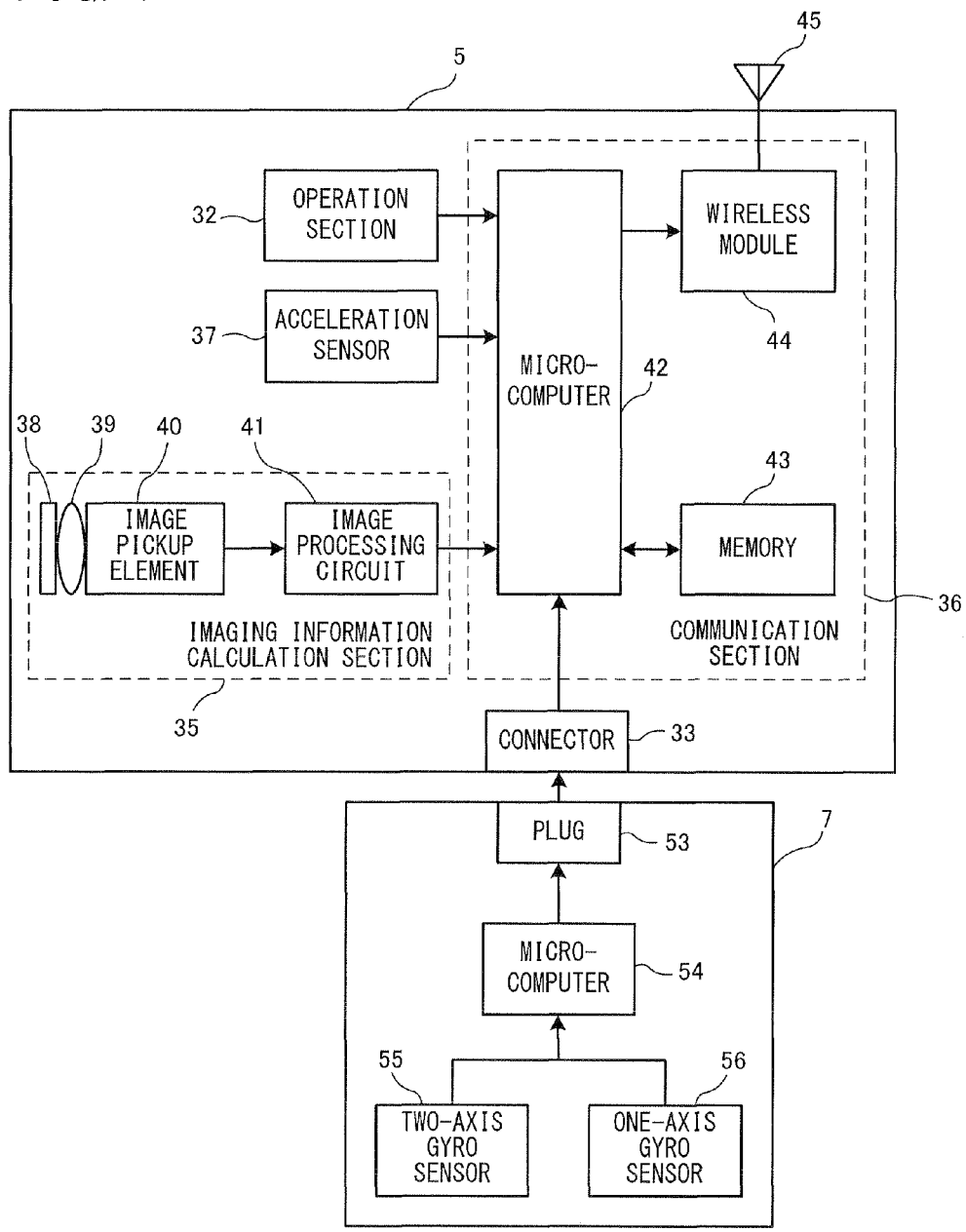
FIG. 7 is a block diagram illustrating a configuration of the input device.

Further, the gyro sensor unit 7 includes a gyro sensor (gyro sensors 55 and 56 shown in. FIG. 7) for detecting for angular velocities around three axes, respectively. The gyro sensor unit 7 is detachably mounted to the connector 33 of the controller 5. The gyro sensor unit 7 has, at the front edge (an edge portion facing toward the Z-axis positive direction shown in FIG. 3), a plug (a plug 53 shown in. FIG. 7) connectable to the connector 33. Further, the plug 53 has hooks (not shown) on both sides, respectively. In a state where the gyro sensor unit 7 is mounted to the controller 5, the plug 53 is connected to the connector 33, and the hooks engage in the locking holes 33a, respectively, of the controller 5. Therefore, the controller 5 and the gyro sensor unit 7 are securely fixed to each other. Further, the gyro sensor unit 7 has a button 51 on each side surface (surfaces facing toward the X-axis direction shown in FIG. 3). When the buttons 51 are pressed, the hooks are disengaged from the locking holes 33a. Therefore, when the plug 53 is removed from the connector 33 while the buttons 51 are being pressed, the gyro sensor unit 7 can be disconnected from the controller 5.

Further, a connector having the same shape as the connector 33 is provided at the rear edge of the gyro sensor unit 7. Therefore, another device which can be mounted to (the connector 33 of) the controller 5 can be mounted to the connector of the gyro sensor unit 7. In FIG. 3, a cover 52 is detachably provided over the connector.

FIGS. 3 to 6 each shows only examples of a shape of each of the controller 5 and the gyro sensor unit 7, a shape of each operation button, the number of acceleration sensors, the number of vibrators, fixing positions of the acceleration sensor and the vibrator, respectively, and the like. Other shapes, numbers, and fixing positions may be applicable. Further, although in the present embodiment the imaging direction of the image pickup means is Z-axis positive direction, the imaging direction may be any direction. That is, the imagining information calculation section 35 (the light incident surface 35a of the imaging information calculation section 35) of the controller 5 may not be provided on the front surface of the housing 31, but may be provided on any other surface on which a light can be received from the outside of the housing 31.

FIG. 7 is a block diagram illustrating a configuration of the input device 8 (the controller 5 and the gyro sensor unit 7). The controller 5 includes an operation section 32 (the respective operation buttons 32a to 32i), the connector 33, the imaging information calculation section 35, a communication section 36, and the acceleration sensor 37. The controller 5 transmits, as operation data, data representing a content of operation performed on the controller 5 itself, to the game apparatus 3.

The operation section 32 includes the operation buttons 32a to 32i described above, and outputs, to the microcomputer 42 of a communication section 36, operation button data indicating an input state (that is, whether or not each operation button 32a to 32i is pressed) of each operation button 32a to 32i.

The imaging information calculation section 35 is a system for analyzing image data taken by the image pickup means and calculating the centroid, the size and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows only infrared light to pass therethrough, among light incident on the front surface of the controller 5. The lens 39 collects the infrared light which has passed through the infrared filter 38 so as to be incident on the image pickup element 40. The image pickup element 40 is a solid-state imaging device such as, for example, a CMOS sensor or a CCD sensor, and receives the infrared light collected by the lens 39, and outputs an image signal. The markers 6R and 6L of the marker section 6 provided near the display screen of the television 2 each includes an infrared LED for outputting infrared light forward from the television 2. Therefore, the infrared filter 38 enables the image pickup element 40 to receive only the infrared light which has passed through the infrared filter 38 and generate image data, so that an image of each of the markers 6R and 6L can be captured with enhanced accuracy. Hereinafter, the image captured by the image pickup element 40 is referred to as a pickup image. The image data generated by the image pickup element 40 is processed by the image processing circuit 41. The image processing circuit 41 calculates, in the pickup image, a position of an imaging subject (the marker 6R and the marker 6L). The image processing circuit 41 outputs data representing a coordinate point of the calculated position, to the microcomputer 42 of the communication section 36. The data representing the coordinate point is transmitted as operation data to the game apparatus 3 by the microcomputer 42. Hereinafter, the coordinate point is referred to as a "marker coordinate point." The marker coordinate point changes depending on an orientation (angle of tilt) and/or a position of the controller 5 itself, and therefore the game apparatus 3 is allowed to calculate the orientation and the position of the controller 5 by using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects for an acceleration (including gravitational acceleration) of the controller 5, that is, detects for a force (including gravity) applied to the controller 5. The acceleration sensor 37 detects a value of an acceleration (linear acceleration) in along the sensing axis direction, among accelerations applied to a detection section of the acceleration sensor 37. For example, a multiaxial acceleration sensor having two or more axes detects an acceleration of a component for each axis, as an acceleration applied to the detection section of the acceleration sensor. The acceleration sensor 37 is, for example, an electrostatic capacitance type acceleration sensor. However, another type of acceleration sensor may be used.

In the present embodiment, the acceleration sensor 37 detects a linear acceleration in three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration for the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing an acceleration detected by the acceleration sensor 37 is outputted to the communication section 36.

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyro sensor unit 7 is inputted to the microcomputer 42 through the connector 33. Hereinafter, a structure of the gyro sensor unit 7 will be described.

The gyro sensor unit 7 includes the plug 53, a microcomputer 54, the two-axis gyro sensor 55, and the one-axis gyro sensor 56. As described above, the gyro sensor unit 7 detects angular velocities around three axes (XYZ axes shown in FIG. 3 in the case of the present embodiment), respectively, and transmits data (angular velocity data) representing the detected angular velocities, to the controller 5.

The two-axis gyro sensor 55 detects an angular velocity (per unit time) around each of the X-axis and the Y-axis. Further, the one-axis gyro sensor 56 detects an angular velocity (per unit time) around the Z-axis. In the present invention, directions of the rotations around the Z-axis, the X-axis, and the Y-axis of the controller 5 are referred to as a roll direction, a pitch direction, and a yaw direction, respectively. That is, the two-axis gyro sensor 55 detects angular velocities in the pitch direction (direction of rotation around the X-axis) and the yaw direction (direction of rotation around the Y-axis), and the one-axis gyro sensor 56 detects an angular velocity in the roll direction (the direction of rotation around the Z-axis).

In the present embodiment, the two-axis gyro sensor 55 and the one-axis gyro sensor 56 are used so as to detect the angular velocities around the three axes. However, in another embodiment, the number of gyro sensors and a combination thereof to be used may be optionally selected provided that the angular velocities around the three axes can be detected.

Further, in the present embodiment, the three axes around which the gyro sensors 55 and 56 detect the angular velocities are set to correspond to three axes (XYZ-axes), respectively, for which the acceleration sensor 37 detects the accelerations. However, in another embodiment, the three axes around which the gyro sensors 55 and 56 detect the angular velocities need not correspond to the three axes for which the acceleration sensor 37 detects the accelerations.

Data representing the angular velocities detected by the gyro sensors 55 and 56 are outputted to the microcomputer 54. Therefore, data representing the angular velocities around the three axes of the X, Y, and Z axes are inputted to the microcomputer 54. The microcomputer 54 transmits the data representing the angular velocities around the three axes, as angular velocity data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyro sensor unit 7 to the microcomputer 42 are temporarily stored in the memory 43. The data are transmitted as the operation data to the game apparatus 3. At a timing of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

The game apparatus 3 performs various processes based on the operation data inputted via the wireless controller module 19. For example, an orientation of the controller 5 is calculated based on data representing the angular velocities around the three axes of the X, Y, and Z axes of the controller 5, and an action of an object in a virtual space is controlled in accordance with the orientation of the controller 5.

When the controller 5 is used, a player is allowed not only to perform a conventional typical game operation of pressing the respective operation buttons, but also to perform an operation of tilting the controller 5 in a desired direction (in the roll direction, the pitch direction, the yaw direction). Other than these operations, by using the controller 5, a player is allowed to perform an operation of designating a desired position on a screen, or perform an operation of moving the controller 5 itself.

[Details of Game Processing]

Next, game processing performed by the game system 1 will be described in detail with reference to FIGS. 8 to 19.

Figure 8:
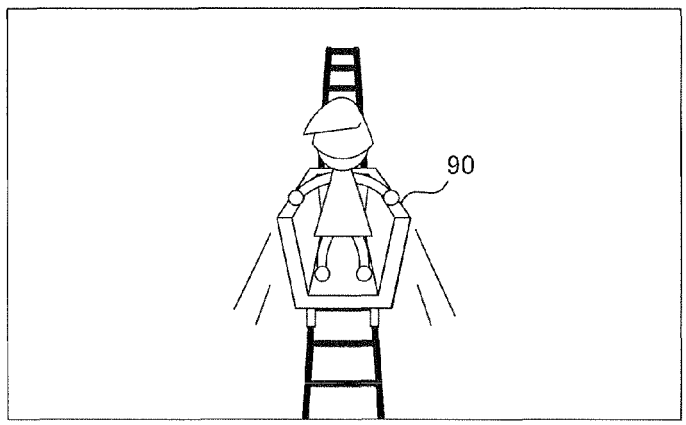
FIG. 8 shows an example of a game image.
Figure 9:
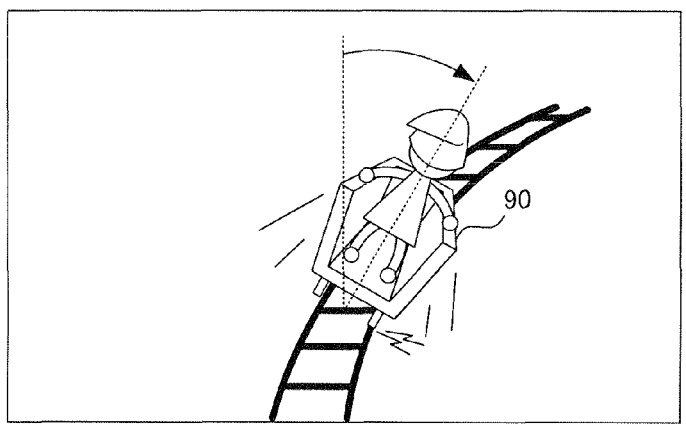
FIG. 9 shows another example of the game image.
Figure 10:
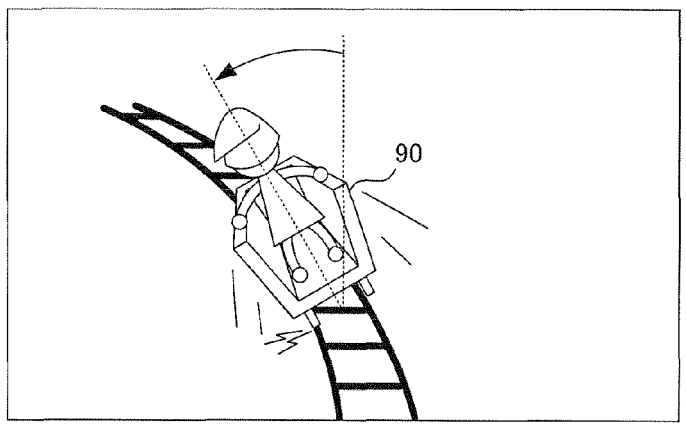
FIG. 10 shows still another example of the game image.

FIGS. 8 to 10 show examples of a game image which is displayed on a screen of the television 2 during a game. In the game performed in the present embodiment, an action of a predetermined object in a game world (virtual space) is controlled in accordance with an operation performed by a player. Specifically, in a game world shown in FIG. 8, an object 90 representing a cart is running on a track. When a player changes an orientation of the input device 8, the object 90 is tilted accordingly in the right direction or in the left direction. For example, at a place where the track is curved to right as shown in FIG. 9, the object 90 needs to be tilted to the right at an appropriate angle in accordance with the curvature of the curve. Otherwise, the object 90 might be derailed. Likewise, at a place where the track is curved to left as shown in FIG. 10, the object 90 needs to be tilted to the left at an appropriate angle in accordance with the curvature of the curve. An objective of the player in this game is to lead the object 90 to a goal point without derailing the object 90.

Figure 11:
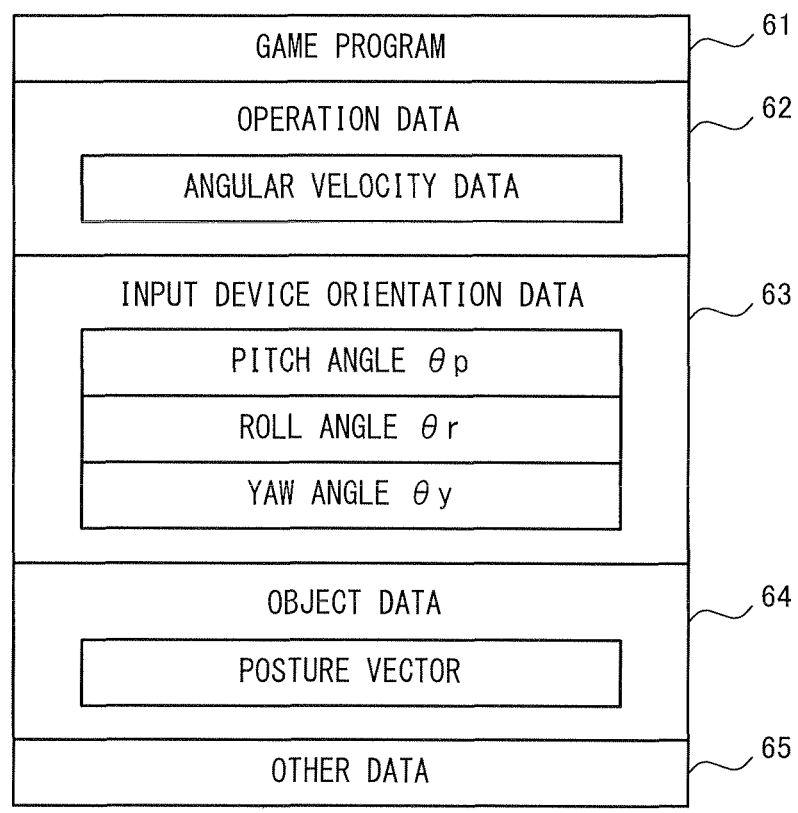
FIG. 11 shows a memory map of a main memory.

FIG. 11 shows an example of data stored in the external main memory 12 (or the internal main memory 11e) when a game program 61 is executed. As shown in FIG. 11, the external main memory 12 stores the game program 61, operation data 62, input device orientation data 63, object data 64, other data 65, and the like.

The game program 61 is a computer program for causing the CPU 10 of the game apparatus 3 to perform various processes shown in later-described flow charts of FIGS. 12 to 14. The game program 61 is loaded, for example, from the optical disc 4 into the external main memory 12.

The operation data 62 is data contained in a signal transmitted from the input device 8 to the game apparatus 3, the data representing an operation performed by the player with respect to the input device 8. The operation data 62 contains angular velocity data (data representing respective angular velocities around the X-axis, the Y-axis, and the Z-axis) outputted from the gyro sensor unit 7 of the input device 8.

The input device orientation data 63 is data representing an orientation of the input device 8 and contains a pitch angle θp representing an orientation of the input device 8 around the X-axis, a roll angle θr representing an orientation of the input device 8 around the Z-axis, and a yaw angle θy representing an orientation of the input device 8 around the Y-axis. The pitch angle θp represents a rotation angle around the X-axis from a reference orientation (as shown in FIG. 1, for example, an orientation of the input device 8 when the Z-axis positive direction of the input device 8 is directed to the television 2 and the Y-axis positive direction of the input device 8 is directed vertically upward). The roll angle θr represents a rotation angle around the Z-axis from the reference orientation. The yaw angle θy represents a rotation angle around the Y-axis from the reference orientation.

The object data 64 is data regarding the object 90 in the game world and contains data such as a shape, a position, a posture, and a design of the object 90. The posture of the object 90 is represented by, for example, a posture vector.

Next, with reference to the flow charts of FIGS. 12 to 14, a flow of processing executed by the CPU 10 based on the game program 61 will be described.

Figure 12:
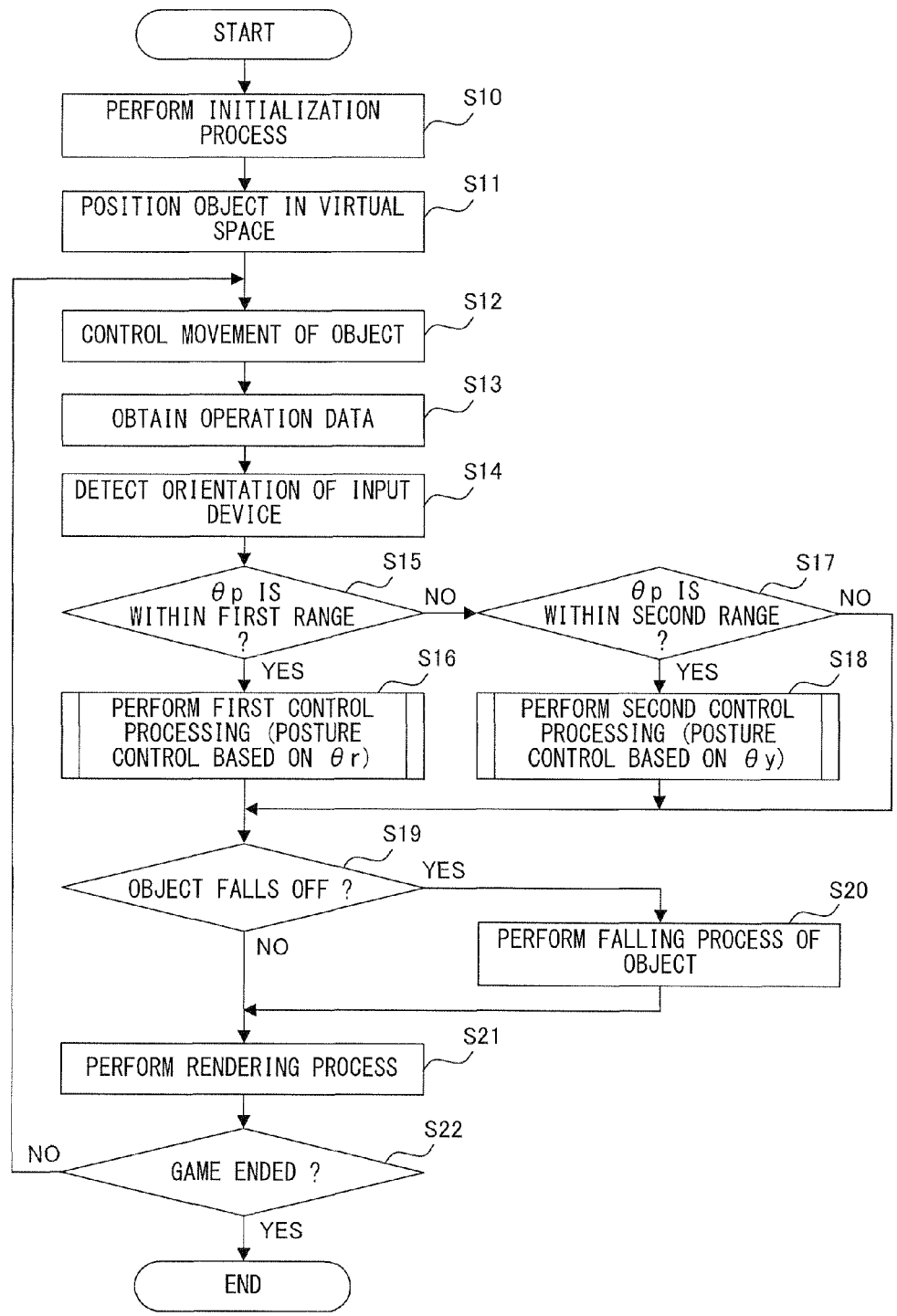
FIG. 12 is a flow chart of main processing.

When execution of the game program 61 is started, the CPU 10 performs an initialization process in step S10 of FIG. 12. In this step, processes such as setting an initial value of each of various parameters used in the game processing; and obtaining a reference orientation of the input device 8 (that is, a process of, for example, giving an instruction to a player to put down the input device 8 in a position as shown in FIG. 1 and setting the pitch angle θp, the roll angle θr, and the yaw angle θy of the input device, which are contained in the posture data 63, to 0) are performed.

In step S11, the CPU 10 positions the object 90 in a predetermined position in the virtual space.

In step S12, the CPU 10 controls the movement of the object 90. In other words, the CPU 10 updates the position of the object 90 in the game world in accordance with undulation and the like of the track.

In step S13, the CPU 10 obtains the operation data 62 from the input device 8 and stores the operation data 62 in the external main memory 12.

In step S14, the CPU 10 detects, based on the angular velocity data contained in the operation data 62, an orientation of the input device 8 (an orientation around the X-axis, an orientation around the Y-axis, and an orientation around the Z-axis) and updates the pitch angle θp, the roll angle θr, and the yaw angle θy of the input device orientation data 63.

Figure 15:
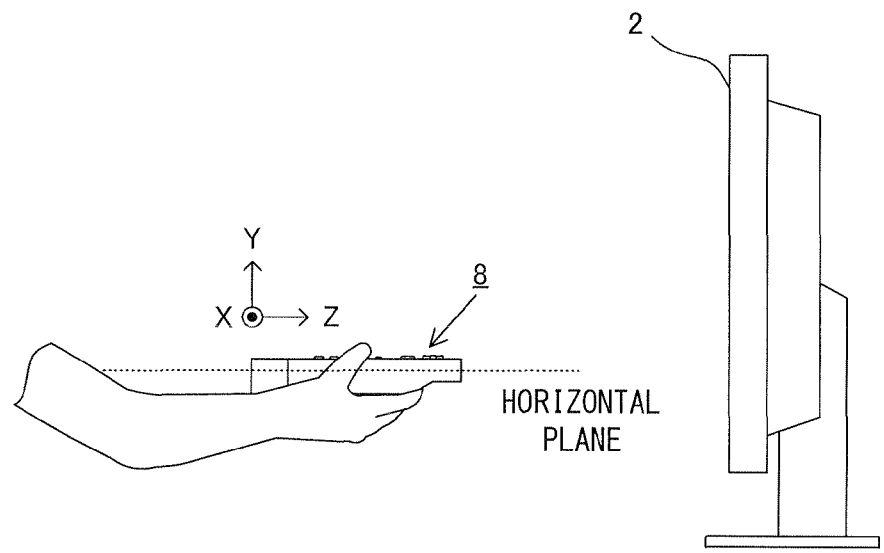
FIG. 15 is a side view of a hand of a player when playing a game.
Figure 16:
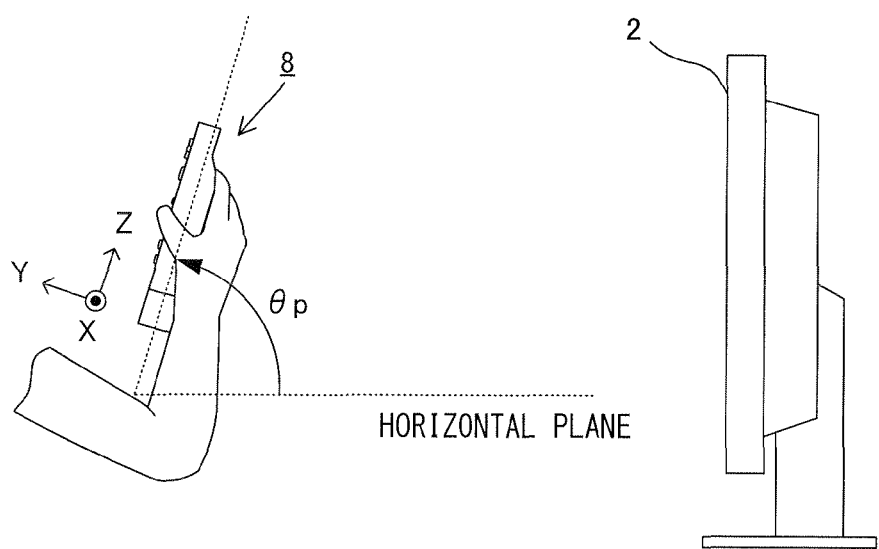
FIG. 16 is another side view of a hand of the player when playing a game.
Figure 17:
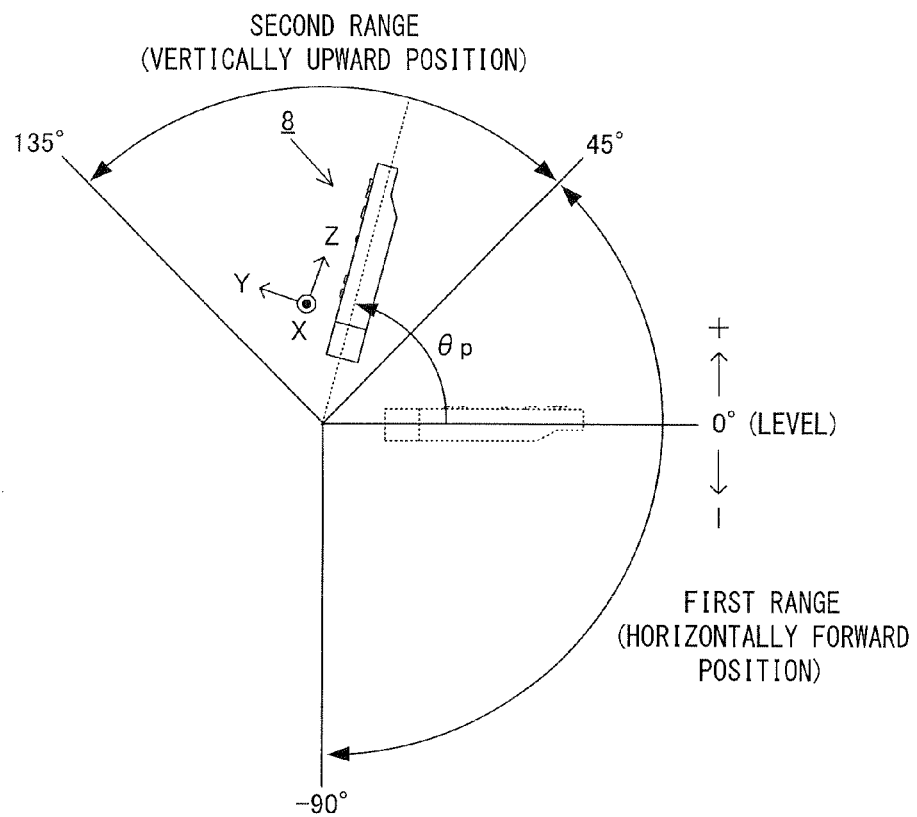
FIG. 17 shows an example of a first range and a second range.
Figure 18:
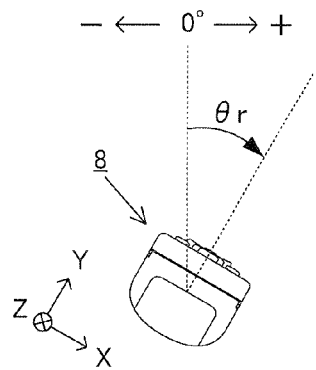
FIG. 18 shows a roll angle θr.
Figure 19:
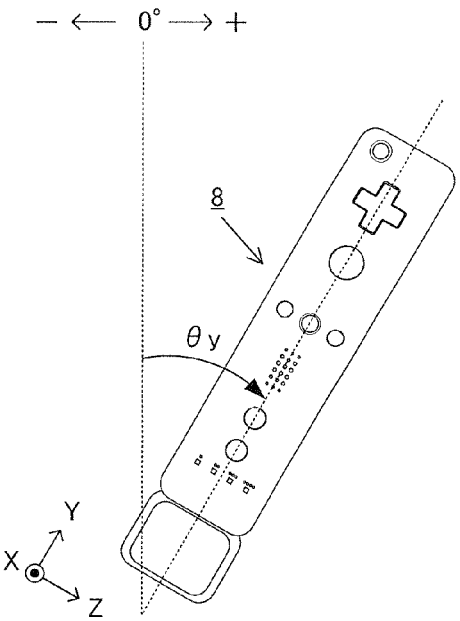
FIG. 19 shows a yaw angle θy.

In step S15, the CPU 10 determines whether the pitch angle θp is within a first range. In the present embodiment, in step S15 and after-mentioned step S17, it is determined, based on the pitch angle θp, whether the player is holding the input device 8 in a "horizontally forward position" or in a "vertically upward position." The "horizontally forward position" is, as shown in FIG. 15, a position at which the player holds the input device 8 such that the Z-axis positive direction of the input device 8 substantially faces forward with respect to the player. The "vertically upward position" is, as shown in FIG. 16, the position at which the player holds the input device 8 such that the Z-axis positive direction of the input device 8 substantially faces upward. In step S15, the CPU 10 determines whether the pitch angle θp is within the first range. When the CPU 10 has determined that the pitch angle θp is within the first range and thus the controller 8 is held in the "horizontally forward position," the CPU 10 proceeds to step S16. Otherwise, the CPU 10 proceeds to step S17. In the present embodiment, the first range is a range between −90 degrees to +45 degrees as shown in FIG. 17.

In step S16, the CPU 10 performs a first control processing. The first control processing is a process of controlling a posture of the object 90 based on the roll angle θr (see FIG. 18). Details of the first control processing will be described later.

In step S17, the CPU 10 determines whether the pitch angle θp is within the second range. When the CPU 10 has determined that pitch angle θp is within the second range and thus the controller 8 is held in the "vertically upward position," the CPU 10 proceeds to step S18. Otherwise, the CPU 10 proceeds to step S19. In the present embodiment, the second range is a range between +45 degrees to +135 degrees as shown in FIG. 17.

In step S18, the CPU 10 performs a second control processing. The second control processing is a process of controlling a posture of the object 90 based on the yaw angle θy (see FIG. 19). Details of the second control processing will be described later.

In step S19, the CPU 10 determines, based on a posture of the object 90 and a curvature of curve of the track at which the object 90 is currently positioned, whether the object 90 falls off. When the CPU 10 has determined that the object 90 falls off, the CPU 10 proceeds to step S20. Otherwise, the CPU 10 proceeds to step S21.

In step S20, the CPU 10 performs a falling process of an object (a process of, for example, starting display of an animation of the object 90 falling off and being derailed).

In step S21, the CPU 10 renders the object 90 in the game world based on the position of the object 90 updated in step S12 and the posture of the object 90 updated in step S16 or step S18, thereby generating a game image. The generated game image is outputted to the television 2 at a predetermined timing and displayed on the screen of the television 2.

In step S22, the CPU 10 determines whether a game has ended. The CPU 10, when it has determined that the game has ended, ends the execution of the game program 61. Otherwise, the CPU 10 proceeds to step S12.

Next, with reference to the flow chart of FIG. 13, details of the first control processing in step S16 of FIG. 12 will be described.

Figure 13:
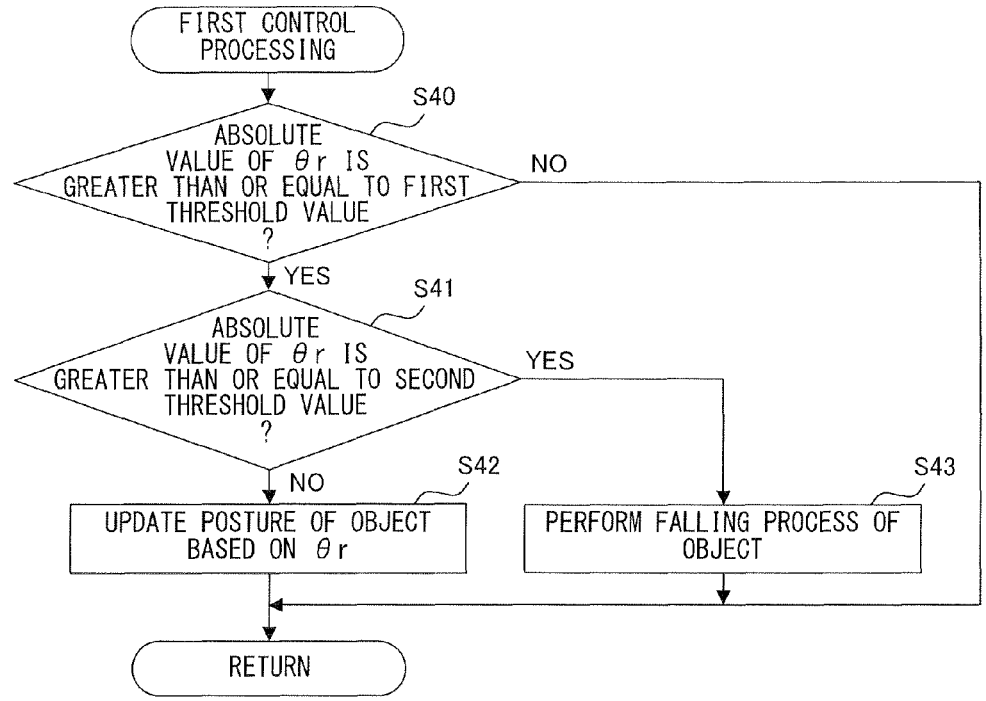
FIG. 13 is a flow chart of a first control process.

In step S40 of FIG. 13, the CPU 10 determines whether the absolute value of the roll angle θr (see FIG. 18) is greater than or equal to a first threshold value (10 degrees, for example). When the CPU 10 has determined that the absolute value of the roll angle θr is greater than or equal to the first threshold value, the CPU 10 proceeds to step S41. Otherwise, the CPU 10 ends the first control processing. In other words, when the absolute value of the roll angle θr is less than the first threshold value, a posture control of the object 90 based on the roll angle θr is not performed. Consequently, the object 90 can be prevented from being unsteady due to an excessive reaction to hand jiggling which occurs even though the player does not intend to tilt the object 90.

In step S41, the CPU 10 determines whether or not the absolute value of the roll angle θr is greater than or equal to a second threshold value (90 degrees, for example). When the CPU 10 has determined that the absolute value of the roll angle θr is greater than or equal to a second threshold value, the CPU 10 proceeds to step S43. Otherwise, the CPU 10 proceeds to step S42.

In step S42, the CPU 10 updates a posture (posture vector) of the object 90 based on the roll angle θr.

In step S43, the CPU 10 performs a falling process of the object (a process of, for example, starting display of an animation of the object 90 falling off and being derailed). In other words, when the absolute value of the roll angle θr is greater than or equal to the second threshold value, regardless of a curvature of curve of the track at which the object 90 is currently positioned, the CPU 10 causes the object 90 to fall off. The second threshold value may be changed dynamically in accordance with a progress of the game (the curvature of curve of the track, for example).

As described above, in the first control processing, the posture of the object 90 is updated based on the roll angle θr, not on the yaw angle θy.

Next, details of the second control processing in step S18 of FIG. 12 will be described with reference to the flow chart of FIG. 14.

Figure 14:
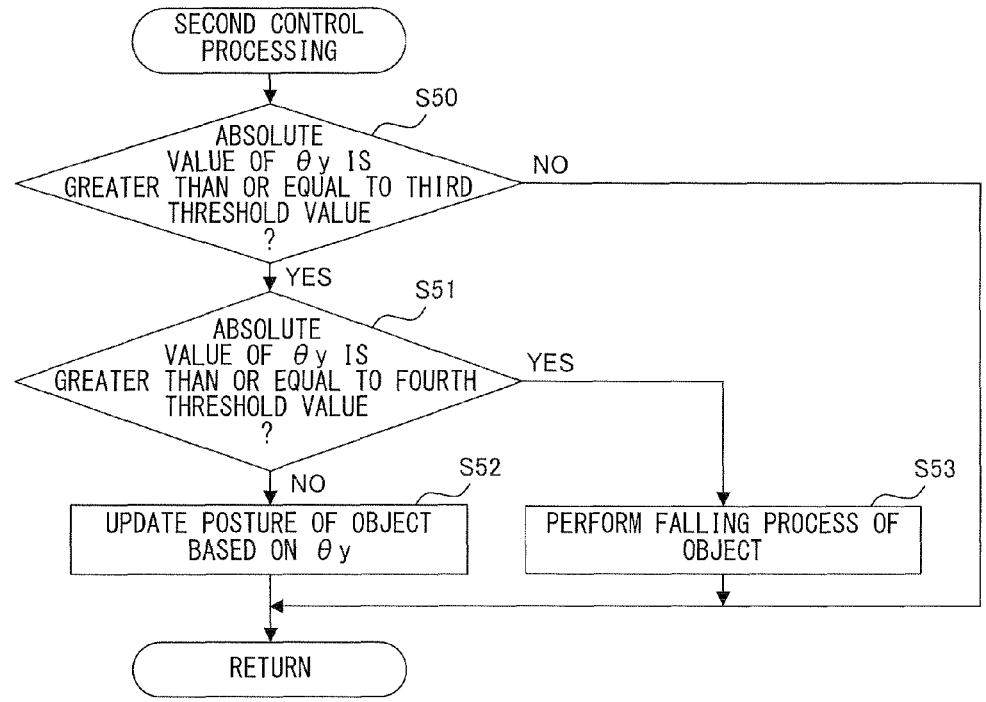
FIG. 14 is a flow chart of a second control process.

In step S50 of FIG. 14, the CPU 10 determines whether or not the absolute value of the yaw angle θy (see FIG. 19) is greater than or equal to a third threshold value (10 degrees, for example). When the CPU 10 has determined that the absolute value of the yaw angle θy is greater than or equal to the third threshold value, the CPU 10 proceeds to step S51. Otherwise, the CPU 10 ends the second control processing. In other words, when the absolute value of the yaw angle θy is less than the third threshold value, a posture control of the object 90 based on the yaw angle θy is not performed. Consequently, the object 90 can be prevented from being unsteady due to an excessive reaction to hand jiggling which occurs even though the player does not intend to tilt the object 90. The third threshold value may be the same as or different from the first threshold value.

In step S51, the CPU 10 determines whether or not the absolute value of the yaw angle θy is greater than or equal to a fourth threshold value (90 degrees, for example). When the CPU 10 has determined that the absolute value of the yaw angle θy is greater than or equal to the fourth threshold value, the CPU 10 proceeds to step S53. Otherwise, the CPU 10 proceeds to step S52. The fourth threshold value may be the same as or different from the second threshold value.

In step S52, the CPU 10 updates the posture (posture vector) of the object 90 based on the yaw angle θy.

In step S53, the CPU 10 performs a falling process of an object (a process of, for example, starting display of an animation of the object 90 falling off and being derailed). In other words, when the absolute value of the yaw angle θy is greater than or equal to the fourth threshold value, regardless of a curvature of curve of the track at which the object 90 is currently positioned, the CPU 10 causes the object 90 to fall off. The fourth threshold value may be changed dynamically in accordance with a progress of the game (the curvature of curve of the track, for example).

As described above, in the second control processing, the posture of the object 90 is updated based on the yaw angle θy, not on the roll angle θr.

[Effect of Embodiment]

As described above, in the present embodiment, the input operation mode of the input device 8 automatically changes based on how a player holds the input device 8. In other words, when the player holds the input device 8 in the "horizontally forward position," the first input operation mode is selected so that the posture of the object 90 is controlled based on the roll angle θr. On the other hand, when the player holds the input device 8 in the "vertically upward position," the second input operation mode is selected so that the posture of the object 90 is controlled based on the yaw angle θy. When the input device 8 is regarded as the object 90, if the player holds the input device 8 in the "horizontally forward position," it is natural and intuitive for the player to tilt the input device 8 in the roll direction, thereby tilting the object 90 leftward or rightward. Likewise, if the player holds the input device 8 in the "vertically upward position," it is natural and intuitive for the player to tilt the input device 8 in the yaw direction, thereby tilting the object 90 leftward or rightward. Consequently, according to the present embodiment, regardless of how the player holds the input device 8, good operability (that is, natural and intuitive operation) can be constantly obtained. In addition, a player can perform an input operation in an input operation mode that suits his/her preference, which allows a greater degree of freedom to the operation.

[Modification]

Figure 20:
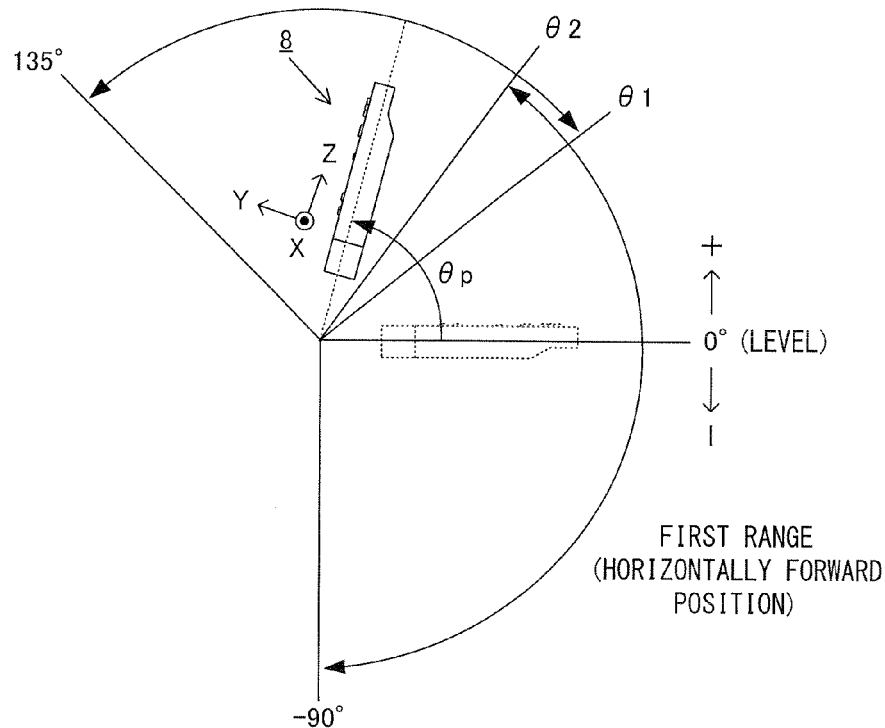
FIG. 20 shows another example of the first range and the second range.

In the present embodiment, as shown in FIG. 17, when the pitch angle θp is within the first range (a range between −90 degrees to +45 degrees), the first input operation mode is selected so that the posture of the object 90 is controlled in accordance with the roll angle θr, while when the pitch angle θp is, as shown in FIG. 17, within the second range (a range between +45 degrees to +135 degrees), the second input operation mode is selected so that the posture of the object 90 is controlled in accordance with the yaw angle θy. However, this is only one example. In another embodiment, for example, as shown in FIG. 20, the input operation mode may be switched from the first input operation mode to the second input operation mode when the pitch angle θp is wider beyond a θ2, and may be switched from the second input operation mode to the first input operation mode when the pitch angle θp is narrower beyond a θ1 (here, θ2>θ1). Accordingly, when a player is holding the input device 8 as in FIG. 17, for example, such that the pitch angle θp is 45 degrees, the input operation mode can be prevented from switching frequently between the first input operation mode and the second input operation mode, resulting in better operability.

Figure 21:
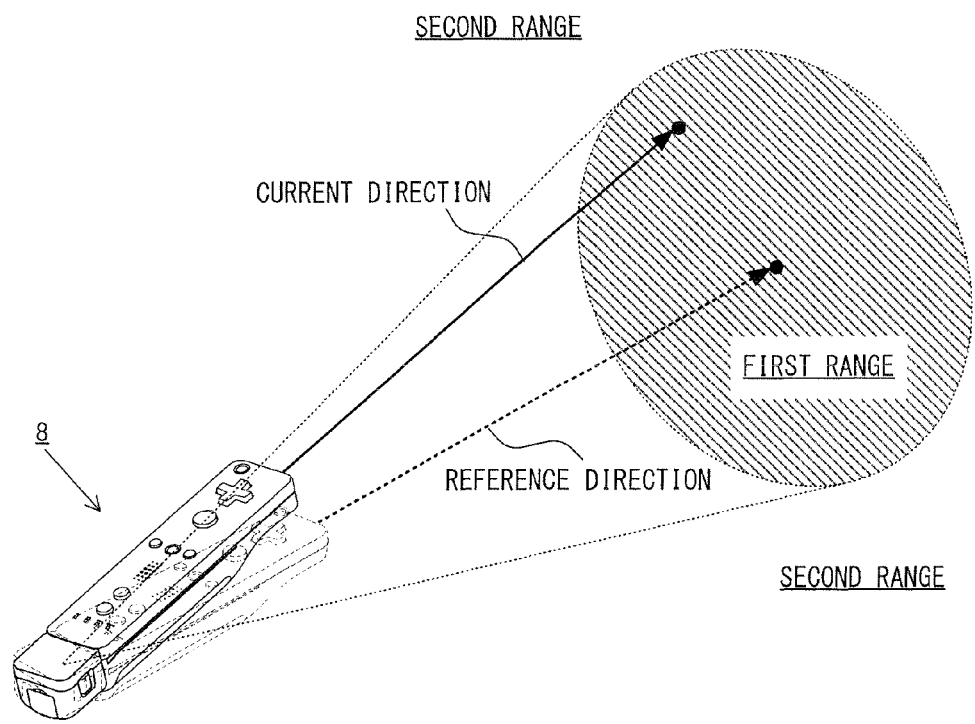
FIG. 21 shows still another example of the first range and the second range.

In the present embodiment, the input operation mode is determined whether to be the first input operation mode or the second input operation mode based on an orientation of the input device 8 around the X-axis (pitch angle θp). However, in another embodiment, the input operation mode may be determined whether to be the first input operation mode or the second input operation mode based on whether the orientation of the input device 8 satisfies a given predetermined condition. For example, as shown in FIG. 21, when the current direction of the input device 8 is within a predetermined first range to whose center the reference direction is directed, the posture of the object 90 may be controlled in accordance with the roll angle θr. When the current direction of the input device 8 is in a second range outside the first range, the posture of the object 90 may be controlled in accordance with the yaw angle θy. Whether the current direction of the input device 8 is in the first range or in the second range may be determined based on a calculation using the pitch angle θp and the yaw angle θy, or may be determined based on a table in which conditions of the pitch angle θp and the yaw angle θy are predefined.

Figure 22:
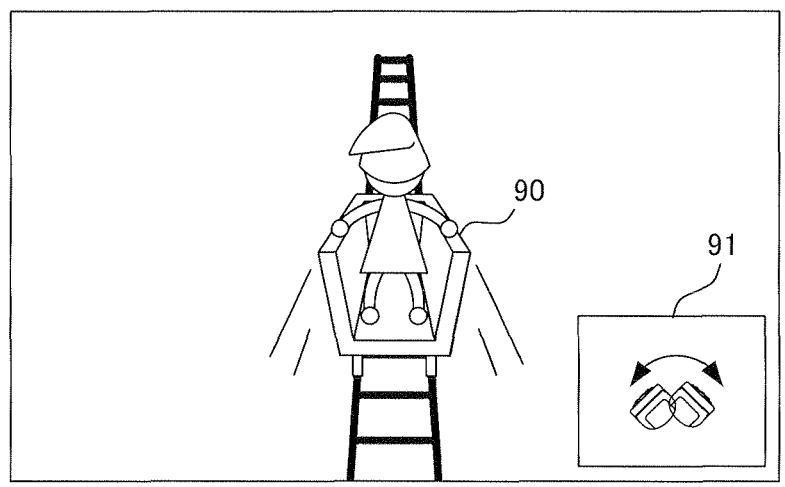
FIG. 22 shows an example of a game image according to a modification of an embodiment.
Figure 23:
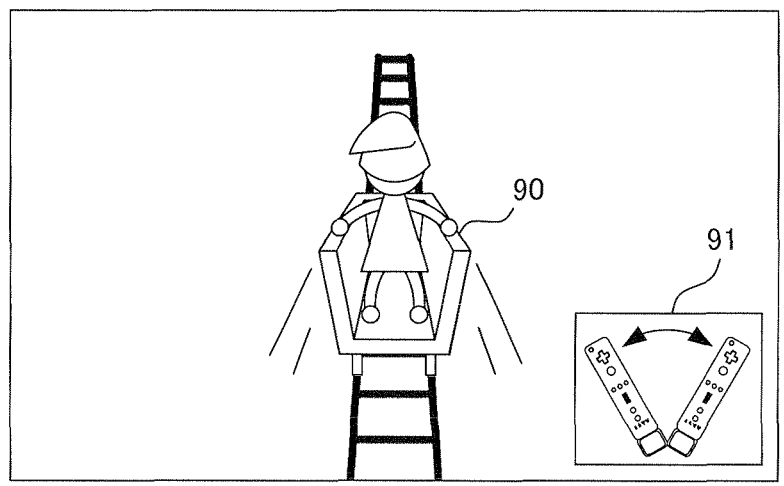
FIG. 23 shows another example of the game image according to the modification of the embodiment.

In the present embodiment, whether the current input operation mode is the first input operation mode or the second input operation mode is not presented to a player. However, in another embodiment, whether the current input operation mode is the first input operation mode or the second input operation mode may be presented to the player. For example, when the current input operation mode is the first input operation mode, a notification image 91 to notify the player of the current input operation mode may be displayed together with a game image as shown in FIG. 22. When the current input operation mode is the second input operation mode, a notification image 91 to notify the player of the current input operation mode may be displayed together with a game image as shown in FIG. 23.

In the present embodiment, a posture of an object is updated in accordance with an orientation of the input device 8. However, in another embodiment, the position or an action of the object may be updated in accordance with the orientation of the input device 8. Further, in addition to a control of an object, other given game parameters may also be updated based on the orientation of the input device 8.

In the present embodiment, the orientation of the input device 8 is detected based on angular velocity data (data representing respective angular velocities around the X-axis, the Y-axis, and Z-axis) outputted from the gyro sensor unit 7 of the input device 8. However, a method for detecting an orientation of the input device 8 may be any desired method. For example, the orientation of the input device 8 may be detected based on acceleration data outputted from an acceleration sensor 37 provided in the input device 8. In this case, by detecting a value of acceleration for each of three axis directions outputted from the acceleration sensor 37, the direction of gravitational acceleration of the input device 8, that is, an orientation of the input device 8, can be identified. Alternatively, for example, the orientation of the input device 8 may be detected by taking an image of the input device 8 with a camera.

In the present embodiment, the posture of the object 90 is updated in accordance with a change in the orientation of the input device 8 around the Z-axis (roll angle θr) in the first control processing. However, in another embodiment, the posture of the object 90 may be updated in accordance with a change in the orientation of the input device 8 around any predetermined axis other than the Z-axis. Likewise, in the present embodiment, the posture of the object 90 is updated in accordance with a change in the orientation of the input device 8 around the X-axis (yaw angle θy) in the second control processing. However, in another embodiment, the posture of the object 90 may be updated in accordance with a change in the orientation of the input device 8 around any predetermined axis other than the X-axis.

In the present embodiment, in the first control processing, when the roll angle θr is less than the first threshold value, the posture of the object 90 is not updated based on the roll angle θr. However, in another embodiment, also when the roll angle θr is less than the first threshold value, the posture of the object 90 may be updated based on the roll angle θr. Likewise, in the present embodiment, in the second control processing, when the yaw angle θy is less than the third threshold value, the posture of the object 90 is not updated based on the yaw angle θy. However, in another embodiment, also when the yaw angle θy is less than the third threshold value, the posture of the object 90 may be updated based on the yaw angle θy.

In the present embodiment, the input device 8 is connected with a game apparatus 3 via wireless communication. However, in another embodiment, the input device 8 may be electrically connected with the game apparatus 3 via a cable.

In the present embodiment, the CPU 10 of the game apparatus 3 executes the game program 61, thereby performing the processing of the above flow chart. However, in another embodiment, a part or the entirety of the processing of the above flow chart may be performed by dedicated circuits provided in the game apparatus 3.

In the present embodiment, the game processing is performed by a single game apparatus 3. However, in another embodiment, the game processing may be performed by a game system which includes a plurality of game apparatuses capable of communicating with each others, in such a manner that the plurality of game apparatuses share the game processing. For example, in a game system which includes a game apparatus and a server device capable of communicating with the game apparatus via a network, a part of the sequential processing (for example, the first control processing in step S16, or the second control processing in step S18) may be performed by the server device. In the game system, the server device may include a plurality of information processing apparatuses and share the processing that should be performed by the server device among the plurality of information processing apparatuses.

As a game apparatus, any information processing apparatus which is capable of performing the game processing by executing the game program 61 (for example, a stationary game apparatus, a portable game apparatus, a personal computer, a mobile phone, or the like) may be used.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a program which causes a computer of an apparatus, which performs processing based on an orientation of an input device, to:

detect an orientation of the input device;
    determine whether the orientation of the input device satisfies a first condition or satisfies a second condition; and
    while the orientation of the input device satisfies the first condition, cause an object in a virtual space to take action in a predetermined direction in accordance with a change in an orientation of the input device around a first axis independent of change in orientation of the input device around a second axis, and, while the orientation of the input device satisfies the second condition, cause the object to take action in the same direction as the predetermined direction in accordance with a change in an orientation of the input device around the second axis independent of change in an orientation of the input device around the first axis.

2. The computer-readable storage medium according to claim 1,
    and further to determine whether an orientation of the input device around a third axis satisfies the first condition or satisfies the second condition.

3. The computer-readable storage medium according to claim 1,
    and further to reflect, while the orientation of the input device satisfies neither the first condition nor the second condition, neither the change in the orientation of the input device around the first axis nor the change in the orientation of the input device around the second axis to the specific parameter.

4. The computer-readable storage medium according to claim 1, wherein
    the input device includes an angular velocity sensor, and
    further to detect the orientation of the input device based on angular velocity data outputted from the angular velocity sensor.

5. The computer-readable storage medium according to claim 4, wherein
    the angular velocity sensor is capable of detecting respective angular velocities of the input device around the first axis, the second axis, and the third axis; and further to detect the orientation of the input device around the first axis, the orientation of the input device around the second axis, and the orientation of the input device around the third axis, based on the respective angular velocities of the input device around the first axis, the second axis, and the third axis, which have been detected by the angular velocity sensor.

6. The computer-readable storage medium according to claim 1, and further to:

determine whether an amount of change in the orientation of the input device around the first axis from a predetermined reference orientation exceeds a predetermined threshold value; and determine whether an amount of change in the orientation of the input device around the second axis from a predetermined reference orientation exceeds a predetermined threshold value, and update, while the orientation of the input device satisfies the first condition, only when the amount of change around the first axis exceeds the predetermined threshold value, the specific parameter in accordance with the change in the orientation of the input device around the first axis, and update, while the orientation of the input device satisfies the second condition, only when the amount of change around the second axis exceeds the predetermined threshold value, the specific parameter in accordance with the change in the orientation of the input device around the second axis.

7. The computer-readable storage medium according to claim 1, wherein the program further causes the computer to generate an image based on the specific parameter.

8. The computer-readable storage medium according to claim 7, wherein the specific parameter is a parameter which affects at least one of a position, a posture, and an action of a specific object in a virtual world, and further to generate an image which contains the specific object.

9. The computer-readable storage medium according to claim 8, wherein the image contains an image indicating whether the orientation of the input device satisfies the first condition or satisfies the second condition.

10. An apparatus which performs processing based on an orientation of an input device, the apparatus comprising:

an orientation detection unit which detects an orientation of the input device;

an orientation determination unit which determines whether the orientation of the input device satisfies a first condition or satisfies a second condition; and a processing unit that, while the orientation of the input device satisfies the first condition, causes an object in a virtual space to take action in a predetermined direction in accordance with a change in an orientation of the input device around a first axis independent of change in an orientation of the input device around a second axis, and while the orientation of the input device satisfies the second condition, causes the object to take action in said predetermined direction in accordance with a change in an orientation of the input device around the second axis independent of change in an orientation of the input device around the first axis.

11. A system which performs processing based on an orientation of an input device, the system comprising:

orientation detector that detects an orientation of the input device;

orientation determiner that determines whether the orientation of the input device satisfies a first condition or satisfies a second condition; and a game processor that, while the orientation of the input device satisfies the first condition, causes an object in a virtual space to take action in a predetermined direction in accordance with a change in an orientation of the input device around a first axis independent of change in an orientation of the input device around a second axis and, while the orientation of the input device satisfies the second condition, causes the object to take action in said predetermined direction in accordance with a change in an orientation of the input device around the second axis without independent of change in an orientation of the input device around the first axis.

12. A method for performing processing based on an orientation of an input device using a processing system, the method comprising:

detecting an orientation of the input device;

determining, with the processing system, whether the orientation of the input device satisfies a first condition or satisfies a second condition; and while the orientation of the input device satisfies the first condition, using the processing system to cause an object in a virtual space to take action in a predetermined direction in accordance with a change in an orientation of the input device around a first axis independent of change in an orientation of the input device around a second axis and, while the orientation of the input device satisfies the second condition, causes the object to take action in said predetermined direction in accordance with a change in an orientation of the input device around the second axis independent of change in an orientation of the input device around the first axis.

* * * * *